Figure 4:
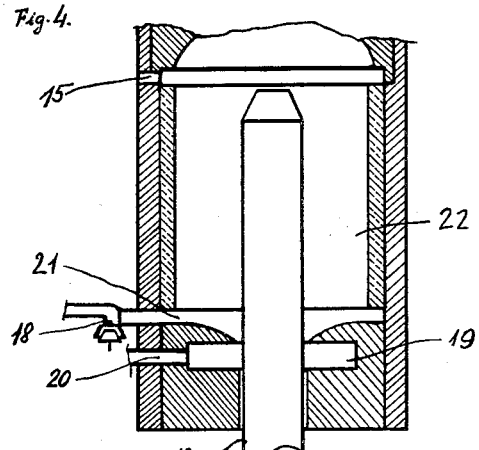

July 9, 1963 T. KUGLER ETAL 3,097,292
METHOD AND APPARATUS FOR THE MAINTENANCE OF THE
ARC COLUMN IN THE CORE OF A LIQUID VORTEX
Filed Nov. 7, 1960 4 Sheets-Sheet 1
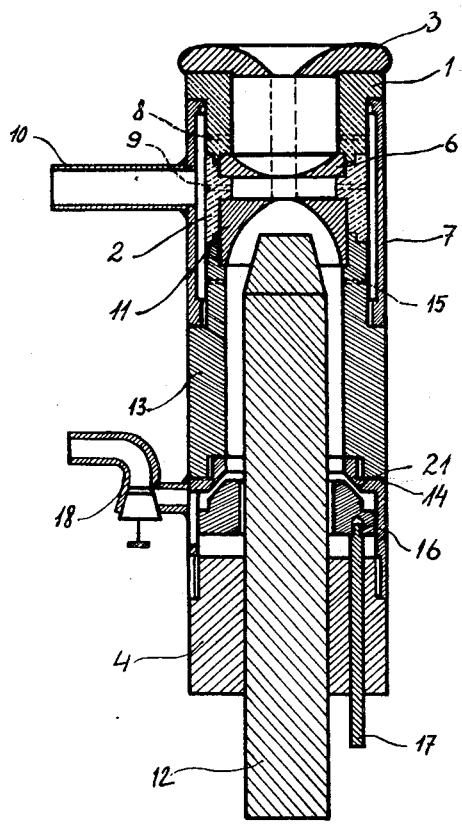
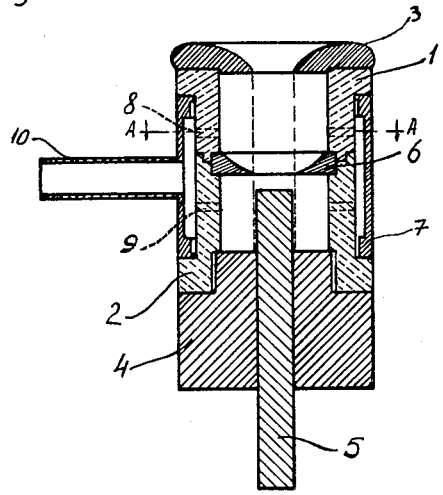
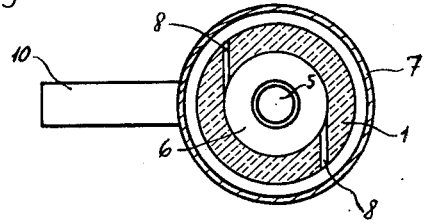
Inventors
TIBOR KUGLER and KONSTANTIN MIKLOSSY
Attorney INVENTORS
TIBOR KUGLER and KONSTANTIN MIKLOSSY TIBOR KUGLER and KONSTANTIN MIKLOSSY INVENTORS
TIBOR KUGLER and KONSTANTIN MIKLOSSY United States Patent Office 3,097,292
Patented July 9, 1963

3,097,292
METHOD AND APPARATUS FOR THE MAINTE-
NANCE OF THE ARC COLUMN IN THE CORE
OF A LIQUID VORTEX
Tibor Kugler and Konstantin Miklóssy, Prague, Czecho-
slovakia, assignors to Kralovopolska Slrojirna, zavody
Chemickych zarizeni, narodni podnik, Brno, Czecho-
slovakia
Filed Nov. 7, 1960, Ser. No. 67,558
Claims priority, application Czechoslovakia Nov. 14, 1959
20 Claims. (Cl. 219—121)

This invention relates to a liquid vortex stabilized arc torch process and apparatus, and constitutes an improvement on the processes and apparatus disclosed in the patent of H. S. Morton, No. 2,906,858.

In prior arc torch arrangements of the type disclosed and claimed in the above patent, the liquid vortex surrounding the arc to constrict and stabilize the same was fed with water passing through the channel in a manner to contact it immediately with the shielding gas or with the arc plasma, but these arrangements were unsatisfactory for reasons given below.

The object of the present invention resides, therefore, in a method and arrangement for the maintenance of an arc column in a channel formed by the core of a fluid vortex, where an improved means for increasing arc constriction and stabilization particularly special diaphragms, are used for the determination of the vortex core dimensions.

It is well known that in stabilizing the electric arc in the core of a fluid vortex, the effort of avoiding the frequent extinguishing of the arc did not meet with success up to now, especially if an inner electrode of a diameter larger than the vortex core diameter was used. At the end of this electrode uneven surfaces are formed, which at accidental variations of the arc intensity disturb the inner surface of the vortex core, and the resulting instabilities extinguish the arc. Moreover no apparatus has yet been proposed in which a fluid stabilized arc should burn on an inner electrode which is not coaxial with the core of a fluid vortex. Furthermore it has been observed that, as the result of the axial variations of the pressure over the core surface, radial deformations of the latter arise diminishing its stabilizing effect. In using an electrode with a diameter smaller than the diameter of the exit orifice, the current range is limited by the physical properties of the electrode material, and even in this case the deformation of the core is not eliminated. Such a limitation of the stabilizing effect necessitates the use of expensive current sources with special characteristics.

The above mentioned difficulties are substantially decreased in accordance with the present invention by inserting or intercalating a chamber for the secondary fluid into the channel in order to avoid the undesirable deformations of the vortex core. This chamber is separated from the exit side, i.e., that nearer the outer electrode, by a diaphragm, the central aperture of which determines the largest diameter of the vortex core at this place so that the secondary fluid flows from the chamber through the central aperture and consequently the core diameter can not exceed the diameter of the aperture. Besides this first diaphragm one or more additional diaphragms may be used, especially for long cores for higher arc voltages. In any case the fluid flow is arranged so that the inner edges of all diaphragm apertures are covered with the fluid and their destruction by the arc heat is prevented. Should the vortex core diameter for the arc stabilization be smaller than the diameter of the inner electrode, the chamber for the inlet of the secondary fluid is limited by a further diaphragm placed against the inner electrode.

The central aperture of this diaphragm increases towards the inner electrode, increasing thereby the diameter of the fluid core around the inner electrode. At the same time provisions are made for the draining of the fluid from the space around the electrode in order to avoid the constriction of the core around the electrode caused by the hydraulic resistance of the drain. In order to achieve an axial extension of the core around the inner electrode, further rotating fluid is supplied in order to maintain the form of the vortex core. In order to attain an easy and reliable arc initiation when using an electrode coaxial with the vortex core, the back wall of the chamber around the inner electrode is formed by an axially movable diaphragm surrounding the electrode. Before arc initiation, this diaphragm is in a retracted position for diminishing the hydraulic resistance of the fluid leaving the chamber and spacing the vortex core surface from the electrode. After ignition of the arc the diaphragm is moved forward, constricting thereby the vortex core around the electrode, enhancing its cooling and preventing the escape of plasma around the electrode.

The same purpose can be attained if instead of a movable diaphragm an unmovable one, having a slot for the exit of water, is used.

After ignition of the arc this slot is closed by a valve and the fluid passes through the annular slot between the electrode and the diaphragm central aperture.

A coaxial turbine chamber may be used to close the inner electrode chamber instead of a diaphragm, this turbine chamber being provided with a liquid or gas inlet and with a circumferential or annular exit slot controlled by a valve.

A continuous wire electrode may replace the coaxial non melting electrode, whereby the electrode chamber is provided with a tangential liquid inlet and by a valve controlled outlet for the superfluous liquid and for the products of the electrode. To the rear part of the electrode chamber a plenum chamber provided with a gas inlet may be attached. Furthermore, an inner electrode chamber may be attached to the vortex chamber divided by diaphragms. The liquid enters into the chamber through the central aperture of the diaphragm, separating the said chamber from the vortex chamber, and flows over the edges and flanges of the diaphragm providing adequate shielding against ablation by plasma. This electrode chamber may contain electrodes or electrode systems of any dimensions and of any orientation in space. The electrode chamber may be provided with inlets for liquid and gas as well as with valve controlled outlets for liquids, gases and products of the electrode. A coaxial arc initiating electrode is also provided.

At the exit site of the vortex channel an outer electrode, enabling the operation of the device with a non transferred arc plasma jet, may be attached in a similar way. In front of this exit diaphragm of the vortex chamber, a further diaphragm is provided in order to guide the liquid leaving the vortex chamber into a collector and exit opening. In front of the outer electrode, a plenum chamber, with a nozzle and with a channel for gas or material to be mixed into the plasma jet, may be provided.

The arrangement according to this invention is based on the discovery that, on the surface of a liquid vortex in which an electric arc is struck, there exist sections with approximately constant gas pressure on the surface, the later being higher than the ambient gas pressure. By placing diaphragms at the limits or boundaries of these sections it is possible to prevent the deformation of the vortex chamber by the pressure of the arc plasma and in the same time to guide a portion of the liquid countercurrently to the direction of the plasma jet, and in this manner to shield the surface of the diaphragm separating the vortex chamber from the electrode chamber against ablation by the plasma.

Figure 5:
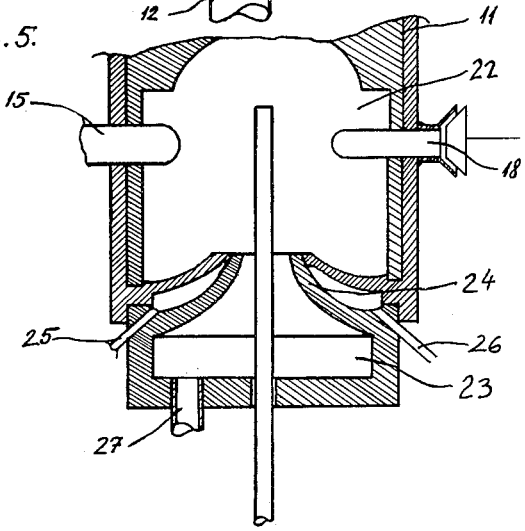
Figure 6:
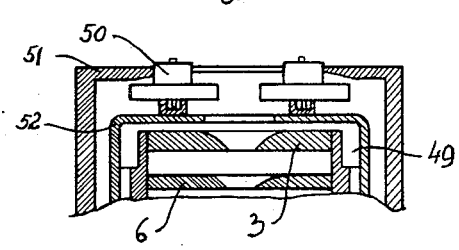
Figure 7:
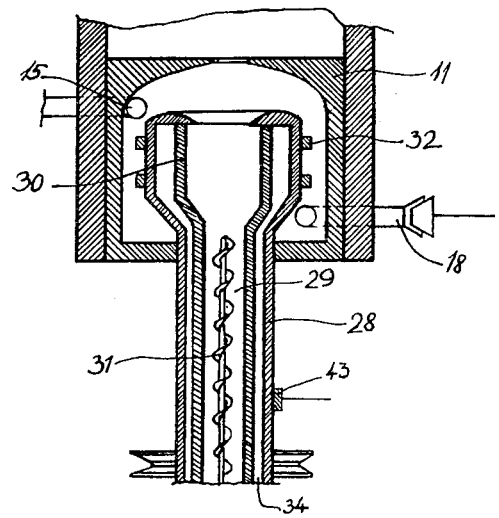
Figure 8:
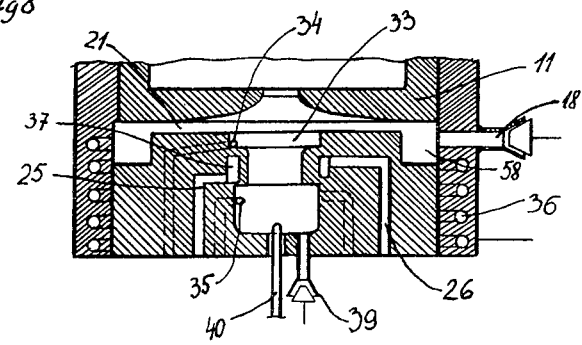
Figure 9:
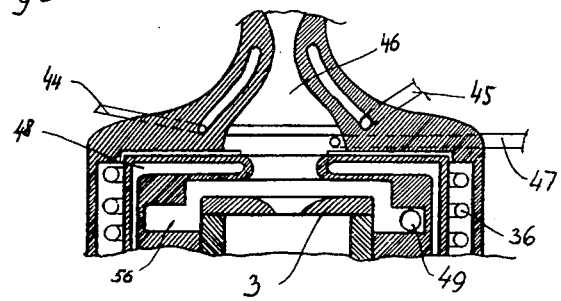

Examples of practical embodiment will now be described fully with reference to the drawing in which:

FIG. 1 is an axial sectional view of an embodiment of the invention using an inner electrode of a smaller diameter than the diameter of the fluid vortex core, FIG. 2 is a diametrical sectional view of this embodiment, taken on line A—A of FIG. 1, FIGS. 3 and 4 are views, similar to FIG. 1, of further embodiments with non melting coaxial electrode having a larger diameter than the diameter of the vortex core, FIG. 5 is an axial sectional view of an electrode chamber with a continuous wire electrode and with a plenum chamber, FIG. 6 is a similar view of an outer electrode system comprising rotating planetary metallic electrodes, FIG. 7 is a similar view showing another embodiment of the inner electrode chamber provided with a rotating cup carrier for pulverized electrode material, FIG. 8 is an axial sectional view of a stable coaxial annular metallic electrode with a solenoid for arc spot rotation, FIG. 9 is a similar view showing a coaxial annular outer electrode with an arc spot rotating solenoid and with a plenum chamber, and FIGS. 10 to 13 are views, similar to FIGS. 8 and 9, showing various embodiments of inner electrode chambers having rotating metallic electrodes.

As apparent from FIGS. 1 and 2 the device embodies a cylindrical chamber 1 for the primary vortex liquid and the chamber 2 for the secondary liquid. The chambers are terminated on the front or exit end by a diaphragm 3 and on the rear end by the electrode fitting 4 providing also the current path for the electrode 5. Chambers 1 and 2 are separated by a diaphragm 6. Around them is provided an annular space 7 for the liquid entering both chambers through the tangential openings 8, 9. As shown in FIG. 3 a further embodiment has an electrode chamber 13 separated from the vortex chamber by a diaphragm 11.

The liquid entering the electrode chamber through the diaphragm is kept in rotation by the addition of liquid tangentially entering through the opening 15. The saddle 14 faces the back wall 16 which is axially movable along the axis of the electrode 12. The annular slot 21 between the saddle 14 and the back wall 16 can be optionally closed either by the movement of the back wall 16 or by the valve 18. In this case the liquid leaves the electrode chamber through the annular slot between the shell of the electrode 12 and the central aperture of the back wall 16. In the embodiment shown in FIG. 4 the rear wall of the electrode chamber 22 is formed with a turbine chamber 19 provided with the liquid inlet 20.

In the electrode chamber shown in FIG. 5, a continuous wire electrode enters the electrode chamber 22 through the annular opening of the diaphragm 24 separating said chamber from the rear plenum chamber 23 provided with the gas inlet 27.

In the embodiment shown in FIG. 6 a planetary outer electrode is used. The rotating diaphragm 52 carries the rolls or pulleys 50 which roll on the annulus 51 establishing thereby the current carrying contact. The liquid passes into the exit chamber 49 between the diaphragm 3 and the diaphragm 52.

In the embodiment shown in FIG. 7 an inner electrode in the form of a rotating cup 30 is provided. The pulverized electrode material is fed by the helix 31 lodged in the channel 29 and is held temporally at the inner surface of the cup 30 by the centrifugal force. Through chamber 28 gas is supplied under the powder layer. Helical vanes 32 located at the outer periphery of the cup help in ejecting the liquid entering the electrode chamber through the central aperture of the diaphragm 11 and through the inlet 15 into the valve controlled outlet 18.

In the embodiment shown in FIG. 8 the liquid enters into the electrode chamber through the central aperture of the diaphragm 11 and flows at the surface of the same through the annular slot 21 and through the collector 38 into an outlet 18. The annular electrode 33 is coaxial with the vortex core and is surrounded by the solenoid 36 destined for the rotation of the arc spot. Gas is introduced through the openings 34, 35 and the superfluous gas leaves the electrode chamber through the valve 33. A coaxial arc initiating electrode 40 is provided in the rear wall of the electrode chamber.

In the embodiment shown in FIG. 9 an annular outer electrode 48 is provided. The arc spot is rotated by the solenoid 36. The liquid from the vortex chamber leaves the device by the annular slot between the electrode 48 and the diaphragm 3 through the collector chamber 56 and the opening 49. In front of the electrode 48 a plenum chamber 46 is provided having a channel 47 for the inlet of various materials into the plasma jet.

In the various embodiments shown in FIGS. 10 to 13 many different systems of the rotating inner electrodes are provided the axes of which do not coincide with the axis of the vortex core. Between the diaphragm 11 and the electrode chamber there is another diaphragm 41 providing a screen against the penetration of liquid droplets into the electrode chamber. The central aperture of the screen 41 is larger than the central opening of the diaphragm 11 in order to avoid its ablation by the palsma. The electrode chambers are provided with gas inlet and gas outlet as well as with an arc initiating electrode 40 in the same way as given in connection with FIGURE 8.

Figure 10:
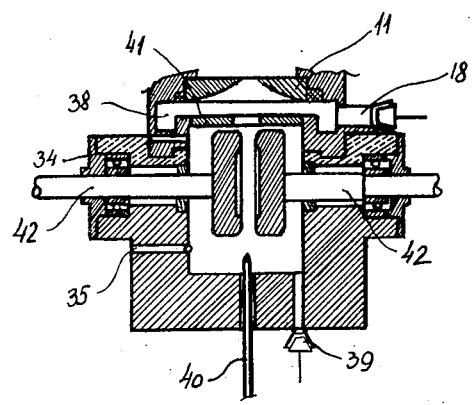

In the embodiment shown in FIG. 10, two rotating electrodes 42, having axes perpendicular to the vortex axis, are provided behind the diaphragm 41. The arc spot burns at the facing surfaces of the two electrodes 42.

Figure 11:
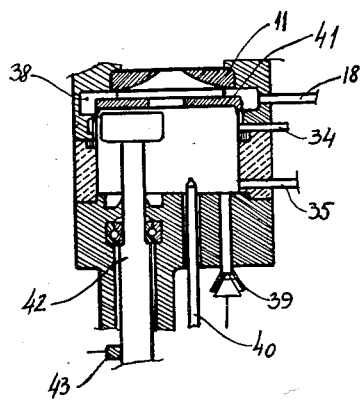

In the embodiment shown in FIG. 11, one cylindrical electrode 42 is placed behind the diaphragm 41, and has an axis parallel to the vortex axis so that the arc spot may burn at the cylindrical surface of the electrode 42.

Figure 12:
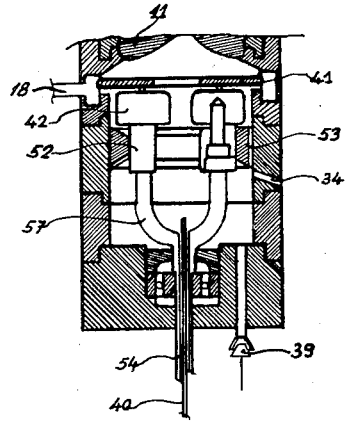

In the embodiment shown in FIG. 12, a group of cylindrical electrodes 42, having axes parallel to the vortex axis is provided. In this particular embodiment, the electrodes are supported on a fork 57 rotating around the vortex axis. Due to the increased centrifugal force, electrodes 42 are pressed against contact ring 53 so as to roll on the latter and achieve a planetary motion.

Figure 13:
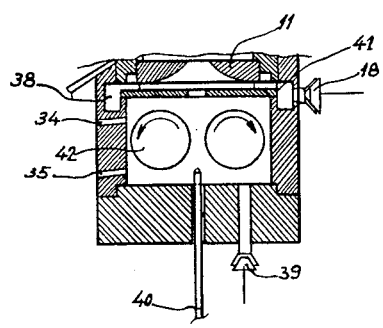

In the embodiment shown in FIG. 13, two rotating electrodes 42 are provided having their axes perpendicular to the plane containing the axis of the vortex. Again, the arc spot burns on the facing surfaces, which are cylindrical, of the two electrodes.

In each embodiment a space is left sufficient for passage of an arc initiating electrode 40 between the two main electrodes.

While specific embodiments of our invention have been shown and described in detail to illustrate the application of the principles of our invention, it will be well understood that the same may be otherwise embodied without departing from such principles and without avoiding the scope of the appended claims.

What we claim as our invention is:

1. In a process wherein an arc is maintained within an axially relatively elongated liquid vortex, the method of preventing radial deformation of the vortex core, due to the axial pressure gradient of the arc plasma, comprising the steps of sub-dividing the liquid vortex into axially adjacent vortex sections each having an axial length such that the axial pressure gradient therealong does not attain a magnitude sufficient to effect appreciable radial deformation of the vortex section core; and separately supplying liquid to each vortex section.

2. The method defined in claim 1 including the step of restricting the outer diameter of the vortex between sections while maintaining the vortex core axially continuous.

3. Apparatus for maintaining an arc column through the core of a liquid vortex comprising, in combination (a) an axially relatively elongated vortex chamber; (b) an inner electrode extending axially into one end of said chamber; (c) at least one annular diaphragm extending across said chamber between said electrode and the opposite end of the chamber to sub-divide the chamber into axially adjacent chamber sections; (d) means, including inlet apertures opening tangentially through the wall of said chamber in each section thereof, for supplying vortex liquid separately to each chamber section in a tangential direction to form the vortex therein; (e) the inner diaphragm diameter having a value such that sufficient liquid can flow axially between the chamber sections to maintain a protecting film of liquid over the diaphragm aperture periphery and to restrict radial deformation of the vortex core by the axial pressure gradient of the arc plasma.

4. Apparatus for maintaining an arc column in the core of a liquid vortex, as claimed in claim 3, including an additional annular diaphragm extending across said chamber between said electrode and the chamber-subdividing diaphragm nearest said electrode, the aperture of said additional diaphragm increasing in diameter toward said inner electrode.

5. Apparatus for maintaining an arc column within the core of a liquid vortex, as claimed in claim 4, in which said additional diaphragm forms part of means defining an electrode chamber for said inner electrode; means forming an inlet for entry of an additional fluid into said electrode chamber; and a valve controlled outlet from said electrode chamber.

6. Apparatus for maintaining an arc column within the core of a liquid vortex, as claimed in claim 4, in which said end of the vortex chamber, having the electrode extending therethrough, is a wall adjustable axially of said electrode.

7. Apparatus for maintaining an arc column within the core of a liquid vortex, as claimed in claim 6, in which said end wall through which said electrode extends is formed as an annular diaphragm having an aperture whose diameter exceeds that of said electrode to provide an axial passage around said electrode through said last-named diaphragm; and valve means controlling flow of fluid through said annular passage.

8. Apparatus for maintaining arc column within the core of a liquid vortex, as claimed in claim 5, in which the chamber end through which said electrode extends is formed as a turbine chamber having a tangential fluid inlet and an annular exit passage around said electrode; and valve means controlling flow through said annular exit passage.

9. Apparatus for maintaining an arc column within the core of a liquid vortex, as claimed in claim 5, including a plenum chamber disposed outwardly of said additional diaphragm and constituted, in part, by said one end of said vortex chamber; said plenum chamber having a gas inlet.

10. Apparatus for maintaining an arc column within the core of a liquid vortex, as claimed in claim 5, in which said electrode is in the form of a cup rotatable about the axis of the vortex core, and constructed and arranged to carry fluid electrode material.

11. Apparatus for maintaining an arc column within the core of a liquid vortex, as claimed in claim 10, including means associated with said rotating cup for supplying gas to said electrode material.

12. Apparatus for maintaining an arc column within the core of a liquid vortex, as claimed in claim 4, including means forming an electrode chamber outwardly, in the direction of said electrode, from said additional diaphragm; said electrode chamber being formed with gas inlet means and a valve controlled gas outlet; means, including a further diaphragm in said electrode chamber, forming an annular slot between said additional diaphragm and said further diaphragm for discharge of liquid into a collector passage in said electrode chamber; means forming a valve controlled exit from said collector passage; and an arc initiating electrode extending into said electrode chamber co-axially of said vortex.

13. Apparatus for maintaining an arc column within the core of a liquid vortex, as claimed in claim 12, including in said electrode chamber an annular metallic electrode which is coaxial with said vortex and constitutes said inner electrode.

14. Apparatus for maintaining an arc column within the core of a liquid vortex, as claimed in claim 13, including magnetic field means surrounding said annular electrode to provide for a rotation of the arc spot on said annular electrode.

15. Apparatus for maintaining an arc column within the core of a liquid vortex, as claimed in claim 12, including at least one rotating metallic electrode having an axis of rotation displaced from the axis of said vortex, and constituting said inner electrode.

16. Apparatus for maintaining an arc column within the core of a liquid vortex, as claimed in claim 4, including a further diaphragm in axially spaced relation to said additional annular diaphragm for guiding liquid discharged from said vortex chamber into a collector passage; and means forming a valve controlled exit from said collector passage.

17. Apparatus for maintaining an arc column within the core of a liquid vortex, as claimed in claim 16, including a metallic annular electrode coaxial with said vortex and constituting said inner electrode.

18. Apparatus for maintaining an arc column within the core of a liquid vortex, as claimed in claim 17, including magnetic field forming means surrounding said annular electrode to provide for rotation of the arc spot around said annular electrode.

19. Apparatus for maintaining an arc column within the core of a liquid vortex, as claimed in claim 16, including at least one rotating metallic electrode having an axis of rotation other than the axis of said vortex, and constituting said inner electrode.

20. Apparatus for maintaining an arc column within the core of a liquid vortex, as claimed in claim 16, including means forming a plenum chamber outwardly of said last named diaphragm, said plenum chamber having an inlet for introduction of material into the plasma jet and being formed with an exit nozzle.

References Cited in the file of this patent

UNITED STATES PATENTS

| | | |
|---|---|---|
| 2,819,423 | Clark | Jan. 7, 1958 |
| 2,900,485 | Clark | Aug. 18, 1959 |
| 2,906,858 | Morton | Sept. 29, 1959 |
| 2,922,869 | Giannini | Jan. 26, 1960 |
| 3,047,709 | Browning | July 31, 1962 |